Dec. 12, 1933.  E. MÉJEAN  1,939,309
DIRECT CURRENT MOTOR CONTROL SYSTEM
Filed Dec. 8, 1932
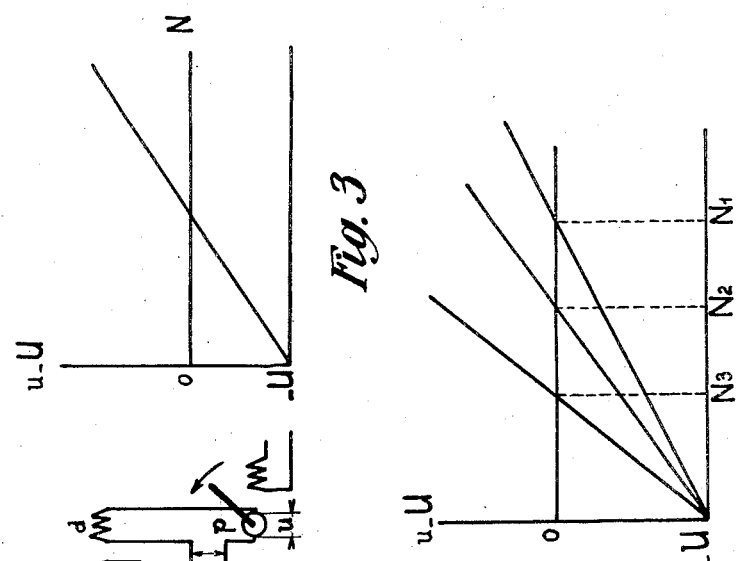
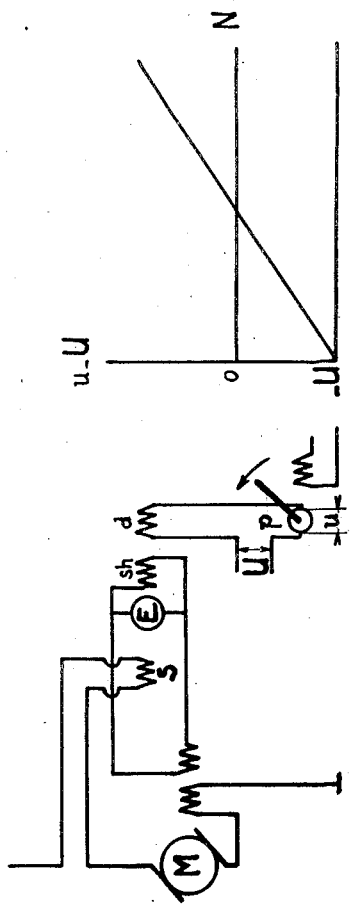
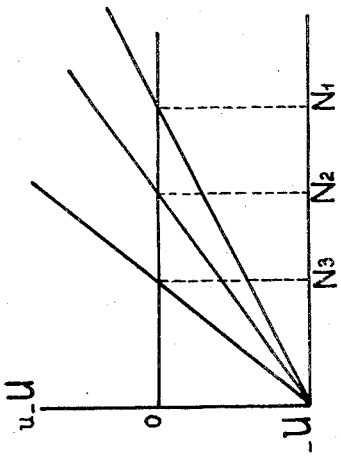
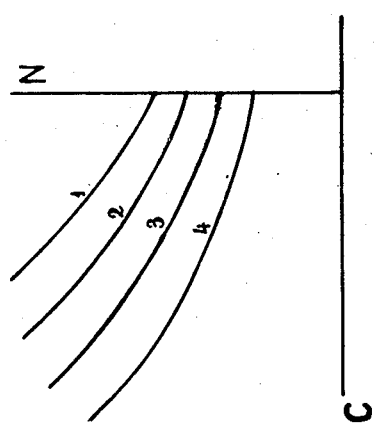
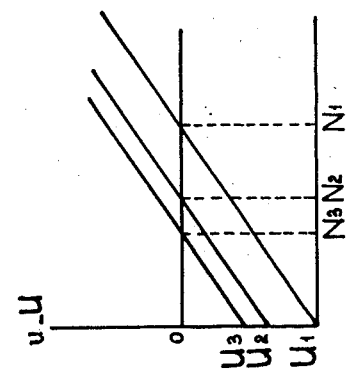
Inventor:-
Ernest Méjean,
By:- Smith, Michael & Gardiner,
Attorneys.

Patented Dec. 12, 1933

1,939,309

UNITED STATES PATENT OFFICE 1,939,309

DIRECT CURRENT MOTOR CONTROL SYSTEM

Ernest Méjean, Paris, France, assignor to Forges & Ateliers De Constructions Electriques De Jeumont Societe Anonyme, Paris, France, a joint-stock company of France Application December 8, 1932, Serial No. 646,312, and in France December 11, 1931

5 Claims. (Cl. 172—179)

This invention relates to direct current motor control particularly for electric traction vehicles, and it consists of an improvement in or modification of the control system described in the French Patent Specification No. 714189; the said control system provides for the starting and regenerative braking of the traction motor or motors at substantially constant torque while the speed varies, and it is applicable to conditions of operation at variable speed with a view to the saving of the energy usually wasted in resistances during the start and to the recovery of kinetic energy from the vehicle when being braked or while descending a gradient.

The said control system is characterized by the use of an exciter having three field windings (shunt, separate and independent) and feeding a field winding of the traction motor, the shunt field winding of the exciter being regulated in such a way that the line of its resistance (volts/amperes) coincides with the initial straight part of its no-load characteristic or magnetization curve (volts/ampere-turns), the separate field winding (which acts cumulatively to said shunt winding during starting and in opposition thereto during regenerative braking) being energized by the motor armature current, and the independent field winding (which acts in opposition to said shunt winding during starting and cumulatively thereto during regenerative braking) being fed at a voltage increasing with the rise of motor speed, the arrangement being such that the separate and the independent field windings of the exciter (acting in opposition to one another) will normally balance out, so that the exciter voltage and therefore the magnetic flux of the traction motor will vary inversely as the motor speed, while the motor armature current will increase uniformly with the speed, whereby operation of the traction motor at constant torque is ensured automatically.

The present invention consists in a modification of the above-mentioned control system with the object of providing improved braking means whereby the speed of the vehicle can be kept to any desired figure while descending a gradient; as is well known, mechanical stability requires that the braking torque exerted by the electrical machine, operating as a generator in these conditions, shall increase with the speed. The invention is characterized by the fact that the independent field of the three-winding exciter is fed by the difference or resultant of two opposing voltages, one being dependent upon the speed and the other being independent of the speed, for the purpose of rendering the traction motor torque during regenerative braking dependent on the speed of the vehicle.

Preferably the voltage dependent upon the speed is furnished by a pilot exciter driven at a speed proportional to that of the vehicle and having a field excited from a separate source; regulation of the braking torque to suit different gradients may be obtained either by varying the voltage given by the pilot exciter at a given speed or by varying the other voltage independent of the speed.

The invention will now be described with reference to the accompanying drawing, in which:—

Figures 1, 3, 4 and 5 are diagrams hereafter explained, and

Figure 2 is a diagram of a motor control system embodying the present invention.

In order to obtain a constant and controllable speed upon different gradients, it is advantageous to provide for a group or system of characteristics, such as 1, 2, 3, 4, ... in Figure 1 of the drawing, each of these curves representing a different proportion of the maximum braking effect or wheel-skidding torque. A fairly steep slope of the characteristic is desirable in order to avoid sudden shocks or rushes of current at passing from one notch to another in braking; in other words, the horizontal distance between two adjacent curves at any given value of the speed (N) should correspond to a moderate increase in the value of the braking torque (C), so that the proper braking effect can be selected for keeping the speed constant on any given gradient.

To realize these conditions, the present invention provides for placing two voltages in opposition in the circuit of the independent field winding $d$ of the exciter E (see Figure 2), which possesses three field windings, one being a shunt field $sh$, another being a separate field S energized by the current I of the traction motor or motors M, and the third being the independent field $d$. As described in the aforesaid French Patent Specification No. 714,189, the separate field S acts cumulatively to the shunt winding $sh$ during the start, but opposes the shunt field during regenerative braking, due to the reversal of the motor current; likewise the independent field $d$ which opposes the shunt field during the start, acts cumulatively during regenerative braking, the separate and independent fields balancing or neutralizing one another so as to maintain the motor torque constant both during the start and in braking. The pilot exciter $p$ is driven at a speed proportional to that of the vehicle or traction motors and provided with a constant field excited from a separate source; any increase of speed will increase the current $I_d$ in the independent field $d$, which reduces the exciter voltage $V$ directly and also owing to the reduction of its shunt field, so that there will be a decrease of the motor flux and back E. M. F., allowing a corresponding increase of the motor current $I$. This increased current flowing in the separate field winding $S$ neutralizes the increase of the independent field $d$ caused by the rise of the pilot exciter voltage, and leaves the shunt field $sh$ of the main exciter weakened by the reduction of its voltage $V$. The strength of the motor field has therefore been reduced in proportion to the increase of speed, and the motor current $I$ increased in the same proportion; converse results will be produced by a decrease of speed, so that it may be stated that the current $I$ will be proportional to the speed, that is, $I/N=$constant, that the ratio $I/I_d$ is also constant, and that the traction motor torque is constant.

Instead of the pilot exciter feeding the independent field $d$ directly, as in the aforesaid French patent specification, the current flowing in the field winding $d$ is supplied by the resultant of two voltages in opposition, one ($U$) being constant at any given notch or position of the controller or the like, that is to say independent of the speed, and the other ($u$) being furnished by the pilot exciter $p$ and therefore varying with the speed ($N$). The variation of the resulting voltage, and therefore of the current in the independent field $d$, is indicated for different values of the speed $N$ by the resultant or difference of the voltages $U$ and $u$ in Figure 3:—

When $u-U$ is greater than 0, the traction motors will operate as generators;

When $u-U=0$, that is when $u$ is equal and opposite to $U$, the current in the independent field $d$ of the exciter $E$ is nil; consequently the motor current $I$ is likewise nil, for the reasons already explained.

When $u-U$ is less than 0, the line current $I$ is the inverse of that in the first case (where $u-U$ is greater than 0), and the tractive effort becomes positive, that is the machines M operate as motors.

It will be seen that for a given notch or position of the controller, if the gradient comes to an end, and the speed falls, the present invention enables the machines M to pass from regenerative working to motor operation, without any intervention by the driver. The reduction of speed necessary to bring this about, will depend on the inclination of the compound characteristic of the machine, which is itself a function of the relation of the independent ampere-turns to the series ampere-turns of the traction motor M and of its magnetic saturation. In each particular case, therefore, it will be possible to obtain the shape of characteristic curve that is most convenient.

A group of different characteristics of the braking torque and speed can be obtained:—

(1) for a given field strength of the pilot exciter $p$, by variation of the applied "constant" voltage $U$ (see Figure 4); at the different values $U_1$ $U_2$ $U_3$ of the voltage $U$, determined by the different "braking" positions of the controller, the current $I_d$ in the field winding $d$ of the exciter $E$, and therefore the line current $I$ will become zero at the speeds $N_1$ $N_2$ $N_3$ respectively, the higher values of the applied voltage corresponding to higher speeds for automatic braking.

(2) for a given applied voltage $U$, by variation of the field strength of the pilot exciter $p$; in this case, the current $I_d$ in the field winding $d$ of the exciter $E$, and therefore the motor line current $I$, will likewise become zero at different values $N_1$ $N_2$ $N_3$ of the speed (see Figure 5), the higher values of the field strength of the pilot exciter corresponding to lower speeds for automatic braking.

The variation of the inclination of the compound characteristic of the motor, apart from possibilities of construction, can also be obtained by introduction or suppression of resistances in the independent field circuit $d$ of the exciter $E$.

The start is still effected at constant torque, as explained above, and for normal driving as motors, the machines M can operate upon their natural characteristics, that is like ordinary series motors. But when regenerative braking is desired, the driver will then have to change the connections, in order once more to bring in the pilot exciter as shown in Figure 2.

This last action for bringing about regenerative braking can however be obviated while retaining the same general arrangement, in the following way:—

When the start at constant torque has been completed, instead of suppressing or cutting out the three-winding exciter $E$ and operating on the natural characteristic of the series motor, the opposing "constant" voltage $U$ is introduced into the circuit of the independent field winding $d$ of the exciter $E$, by means of a suitable switch. In this way the further operation of the motor M will take place upon a compound characteristic, both its field windings remaining in action.

If the vehicle begins to run down a gradient, the speed will increase, the expression $u-U$ will become greater than 0, and the motor will pass over automatically from driving to braking operation without any change of the connections.

By suppression of the opposing "constant" voltage $U$, the value of the braking effort will be increased and the machine M will continue to operate as a generator until it brings the vehicle to rest, the characteristic passing in this case through the point 0 in Figure 3, 4 or 5.

What I claim is:—

1. A direct current motor control system, comprising a motor, an independent field for said motor, a generator for exciting said motor field, said generator having shunt and independent field windings and also a separate field winding excited by the current of said motor, said last-mentioned field winding acting cumulatively with said shunt field winding during the starting of said motor but in opposition to said shunt field winding during regenerative braking of said motor, and means for feeding said independent field winding of said generator by the difference of two opposing voltages, one of said opposing voltages being dependent on the speed of said motor, and said independent field winding of said generator acting cumulatively with said shunt winding during regenerative braking of said motor but in opposition to said shunt winding during the starting of said motor.

2. A direct current motor control system, comprising a motor, an independent field for said motor, a generator for exciting said motor field, said generator having shunt and independent field windings and also a separate field winding excited by the current of said motor, said last mentioned field winding acting cumulatively with said shunt field winding during the starting of said motor but in opposition to said shunt field winding during regenerative braking of said motor, and an exciter driven at a speed dependent on that of said motor said independent field winding of said generator being fed by the difference of two opposing voltages, one of said opposing voltages being that of said exciter, and said independent field winding of said generator acting cumulatively with said shunt winding during regenerative braking of said motor but in opposition to said shunt winding during the starting of said motor.

3. A direct current motor control system, comprising a motor, an independent field for said motor, a generator for exciting said motor field, said generator having shunt and independent field windings and also a separate field winding excited by the current of said motor, said last-mentioned field winding acting cumulatively with said shunt field winding during the starting of said motor but in opposition to said shunt field winding during regenerative braking of said motor, and an exciter driven at a speed dependent on that of said motor, said independent field winding of said generator being fed by the difference of two opposing voltages, one of said opposing voltages being that of said exciter and the other being constant, the voltage of said exciter being variable by regulation of its magnetic field, and said independent field winding of said generator acting cumulatively with said shunt winding during regenerative braking of said motor but in opposition to said shunt winding during the starting of said motor.

4. A direct current motor control system, comprising a motor, an independent field for said motor, a generator for exciting said motor field, said generator having shunt and independent field windings and also a separate field winding excited by the current of said motor, said last-mentioned field winding acting cumulatively with said shunt field winding during the starting of said motor but in opposition to said shunt field winding during regenerative braking of said motor and an exciter driven at a speed dependent on that of said motor, said independent field winding of said generator being fed by the difference of two opposing voltages, one of said opposing voltages being that of said exciter and the other being variable, and said independent field winding of said generator acting cumulatively with said shunt winding during regenerative braking of said motor but in opposition to said shunt winding during the starting of said motor.

5. A direct current motor control system, comprising a motor, series and independent fields for said motor, said series and independent fields acting cumulatively in starting and in normal running, a generator for exciting said independent field, said generator having shunt and independent field windings and also a separate field winding excited by the current of said motor, said last-mentioned field winding acting cumulatively with said shunt field winding during the starting of said motor but in opposition to said shunt field winding during regenerative braking of said motor, and means for feeding said independent field winding of said generator by the difference of two opposing voltages, one of said opposing voltages being dependent on the speed of said motor, and said independent field winding of said generator acting cumulatively with said shunt winding during regenerative braking of said motor but in opposition to said shunt winding during the starting of said motor, said motor operating upon a compound characteristic and being adapted to change automatically from normal running to regenerative braking and vice versa, according to variations of speed above and below a predetermined figure.

ERNEST MÉJEAN.